United States Patent
Steedly (10) Patent No.: US 9,322,518 B1
(45) Date of Patent: Apr. 26, 2016

(54) TROFFER-BASED LED LIGHT FIXTURE AND RETROFITTING METHOD USING SAME

(71) Applicant: MAXLITE, INC., West Caldwell, NJ (US)

(72) Inventor: James Steedly, Menifee, CA (US)

(73) Assignee: MaxLite, Inc., West Caldwell, NJ (US)

( * ) Notice: Subject to any disclaimer, the term of this patent is extended or adjusted under 35 U.S.C. 154(b) by 192 days.

(21) Appl. No.: 14/099,399

(22) Filed: Dec. 6, 2013

Related U.S. Application Data (60) Provisional application No. 61/807,989, filed on Apr. 3, 2013, provisional application No. 61/734,178, filed on Dec. 6, 2012.

(51) Int. Cl.
*F21S 8/02* (2006.01)
*F21V 21/04* (2006.01)
*F21K 99/00* (2010.01)

(52) U.S. Cl.
CPC ... *F21K 9/17* (2013.01); *F21K 9/90* (2013.01); *F21S 8/026* (2013.01); *F21V 21/04* (2013.01)

(58) Field of Classification Search
CPC ............ F21K 9/17; F21K 9/175; F21K 9/90; F21Y 2103/00; F21Y 2103/003; F21V 21/04; F21V 21/041; F21V 21/043; F21S 8/026; F21S 8/04
See application file for complete search history.

(56) References Cited

U.S. PATENT DOCUMENTS

| | | | |
|---|---|---|---|
| 2,591,661 A * | 4/1952 | McCandless | 362/217.05 |
| 3,149,223 A * | 9/1964 | Zimmerman | 392/424 |
| 4,669,033 A | 5/1987 | Lee | |
| 5,613,761 A | 3/1997 | Raby, Sr. et al. | |
| 5,921,667 A | 7/1999 | Raby, Sr. et al. | |
| 6,092,913 A | 7/2000 | Edwards, Jr. | |
| 6,283,612 B1 | 9/2001 | Hunter | |
| 6,739,734 B1 | 5/2004 | Hulgan | |
| 7,083,308 B2 * | 8/2006 | Kenyon | F21V 15/01 362/362 |
| 8,272,763 B1 * | 9/2012 | Chinnam et al. | 362/249.07 |
| 8,727,566 B1 * | 5/2014 | Szeto | 362/235 |
| 8,950,911 B2 * | 2/2015 | Fryzek | F21V 29/004 362/418 |
| 2003/0102810 A1 * | 6/2003 | Cross et al. | 315/74 |
| 2006/0221606 A1 | 10/2006 | Dowling | |

* cited by examiner

*Primary Examiner* — Alan Cariaso
(74) *Attorney, Agent, or Firm* — Hoffmann & Baron, LLP (57) ABSTRACT

A LED light fixture is provided herein for mounting into a troffer housing. The light fixture includes a carrier plate dimensioned to fit within the troffer housing, the carrier plate having a generally flat first portion, a generally flat second portion, and an outwardly indented portion located therebetween. The first and second portions are generally coplanar in a common plane. At least one LED is mounted to the first portion. A driver is electrically coupled to the at least one LED and disposed within the indented portion without extending through the common plane with the driver being fixed to the carrier plate. At least two lead wires are electrically coupled to the driver, and extending therefrom, configured to allow electrical power to pass therethrough to the driver. Advantageously, a LED light fixture is provided herein which is a unitary construction that can be efficiently mounted in a troffer housing.

11 Claims, 15 Drawing Sheets

TROFFER-BASED LED LIGHT FIXTURE AND RETROFITTING METHOD USING SAME

CROSS-REFERENCES TO RELATED APPLICATIONS

This application claims priority to U.S. Provisional Patent Application No. 61/807,989, filed Apr. 3, 2013, and U.S. Provisional Patent Application No. 61/734,178, filed Dec. 6, 2012, the entire contents of which are incorporated by reference herein.

FIELD OF THE INVENTION

This invention relates to LED light fixtures and, more particularly, to LED light fixtures for retrofitting troffer-based fluorescent light fixtures.

BACKGROUND OF THE INVENTION

Troffer-based fluorescent light fixtures are ubiquitously found in commercial and institutional settings and, to a lesser extent, in residential settings. In the United States, standard troffer sizes are 1'×4', 2'×2' and 2'×4', but may, also, be formed of other sizes. With concerns over the environment, fluorescent lighting has been found to be inefficient, and accompanied by environmental waste hazards. LED (light emitting diode) light fixtures are becoming more and more commonplace due to its energy efficiency and usable lifetime.

Techniques have been developed in the prior art for retrofitting troffer-based fluorescent light fixtures to be troffer-based LED light fixtures. For example, U.S. Pat. No. 6,739,734 to Hulgan discloses a retrofit kit which includes a LED retro-reflector. With Hulgan, a power supply is provided which must be separately mounted to the troffer housing from the other components. U.S. Published Patent Appl. No. 2006/0221606 to Dowling discloses a retrofit kit which either includes a raised LED-supporting panel or a completely flat LED-supporting panel.

SUMMARY OF THE INVENTION

A LED light fixture is provided herein for mounting into a troffer housing. The light fixture includes a carrier plate dimensioned to fit within the troffer housing, the carrier plate having a generally flat first portion, a generally flat second portion, and an outwardly indented portion located therebetween. The first and second portions are generally coplanar in a common plane. At least one LED is mounted to the first portion. A driver is electrically coupled to the at least one LED and disposed within the indented portion without extending through the common plane with the driver being fixed to the carrier plate. At least two lead wires are electrically coupled to the driver, and extending therefrom, configured to allow electrical power to pass therethrough to the driver. Advantageously, a LED light fixture is provided herein which is a unitary construction that can be efficiently mounted in a troffer housing.

In a further aspect of the subject invention, a method is provided of retrofitting a troffer-based florescent light fixture to a troffer-based LED light fixture.

These and other features of the invention will be better understood through a study of the following detailed description and accompanying drawings.

DETAILED DESCRIPTION OF THE INVENTION

With reference to the figures, a LED light fixture is shown and generally designated with the reference numeral 10. The light fixture 10 generally includes a carrier plate 12, at least one LED 14, a driver 16, and at least two lead wires 18 electrically coupled to the driver 16. The light fixture 10 is dimensioned to be mounted within a troffer housing, including for retrofitting a troffer-based fluorescent light fixture, as described below.

The carrier plate 12 includes a generally flat first portion 20, a generally flat second portion 22, and an outwardly indented portion 24 located therebetween. Preferably, the indented portion 24 extends along a central longitudinal axis of the carrier plate 12 so as to bisect the carrier plate 12. The first and second portions 20, 22 are preferably generally coplanar in a common plane P.

The carrier plate 14 may be formed unitarily from one sheet of material. Preferably, the carrier plate 12 is metallic. The carrier plate 12 may be formed by various metals in sheet form, including, but not limited to, aluminum or aluminum based alloys. Preferably, the carrier plate 12 is formed by deforming a single sheet of material to define the indented portion 24 between the first and second portions 20, 22. Alternatively, the carrier plate 12 may be formed from a plurality of pieces which are welded or otherwise joined to form the carrier plate 12.

It is preferred that the carrier plate 12 act as a heat sink during use. As such, it is preferred that the carrier plate 12 be provided with a non-reflective, matte finish, particularly on its external face 26 to which the at least one LED 14 is mounted.

The at least one LED 14 is mounted to the carrier plate 14 using any technique. Preferably, a plurality of the LED's 14 is utilized with the subject invention. The LED's 14 may be provided in one or more arrays 28 where a subset of the LED's 14 are electrically coupled. The arrays 28 may be of various configurations. For example, with reference to the figures, a portion of the LED's 14 may be arranged as a strip in which the LED's 14 are electrically coupled in series to define one of the arrays 28. A plurality of the arrays 28 may be utilized. For example, as shown in the figures, a plurality of the arrays 28 may be provided in strip form with the arrays 28 being evenly distributed on the first and second portions 20, 22 about the indented portion 24. This allows for the creation of an evenly distributed light pattern. With the indented portion 24 being located centrally on the carrier plate 12, the light pattern may be evenly distributed symmetrically about a center line of the carrier plate 12.

The driver 16 may be of any known construction to accept standard alternating current and to deliver constant current to the at least one LED 14 to illuminate the at least one LED 14. The driver 16 is electrically coupled to the at least one LED 14 in any known manner. The LED's 14 may be electrically coupled to the driver 16 in series and/or in parallel in varying combinations. Likewise, where the arrays 28 are utilized, the arrays 28 may be electrically coupled to the driver 16 in series or and/or in parallel in varying combinations. Preferably, the arrays 28 are electrically coupled to the driver 16 in parallel.

The driver 16 is secured to the carrier plate 12 with the driver 16 being located within the indented portion 24 without passing through the common plane P. With this arrangement, the driver 16 is wholly contained within the indented portion 24. This allows for the light fixture 10 to be mounted to a troffer housing with the driver 16 being obscured from view yet without any interference from the driver 16.

The lead wires 18 are electrically coupled to the driver 16 so as to receive electrical power from an outside source with transmission of that electrical power to the driver 16. The lead wires 18 may be of any known configuration. The lead wires 18 are preferably provided with sufficient length to be accessed easily through the common plane P to allow for easy manipulation thereof during wiring.

With reference to FIGS. 9-13, a troffer-based fluorescent light fixture 30 may be retrofitted with the light fixture 10. To allow for such retrofitting, all fluorescent bulbs are first removed, and electrical power wires 32, which supply electrical power to the fluorescent light fixture 30, are disconnected from the ballast 34 of the fluorescent light fixture 30.

The light fixture 10 is introduced and the lead wires 18 are electrically coupled to the electrical power wires 32. Thereafter, the carrier plate 12 is fastened to the troffer housing 36 of the light fixture 30 using any known technique. Preferably, mechanical fasteners 38, which may be in the form of machine screws, are utilized. Other fasteners (e.g., sheet metal screws, set screws, etc.) may be utilized. It is also preferred that the light fixture 10 be secured to the troffer housing 36 at the first and second portions 20, 22 of the carrier plate 12. Fastener holes 40 may be pre-formed in the carrier plate 12 to facilitate installation. With the driver 16 being electrically coupled to the electrical power wires 32, and the light fixture 10 being fastened to the troffer housing 36, the light fixture 10 is ready for use. The subject invention allows for a two-step retrofitting of a troffer-based fluorescent light fixture. Once completed, any diffuser 42 may be secured to the troffer housing 36 as known in the art.

Figure 1:
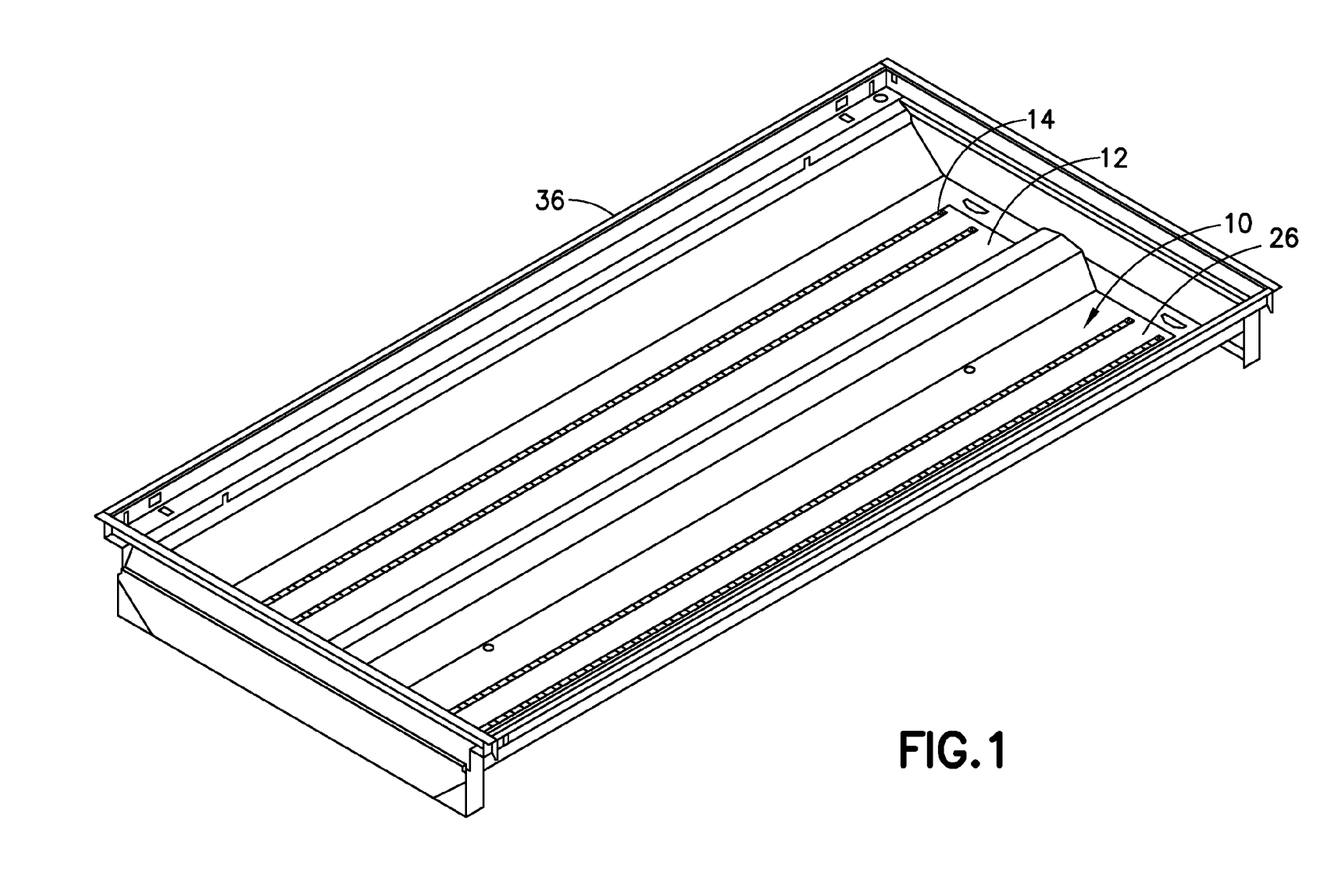
FIG. 1 is a perspective view of a LED light fixture formed in accordance with the subject invention mounted in a troffer housing.
Figure 2:
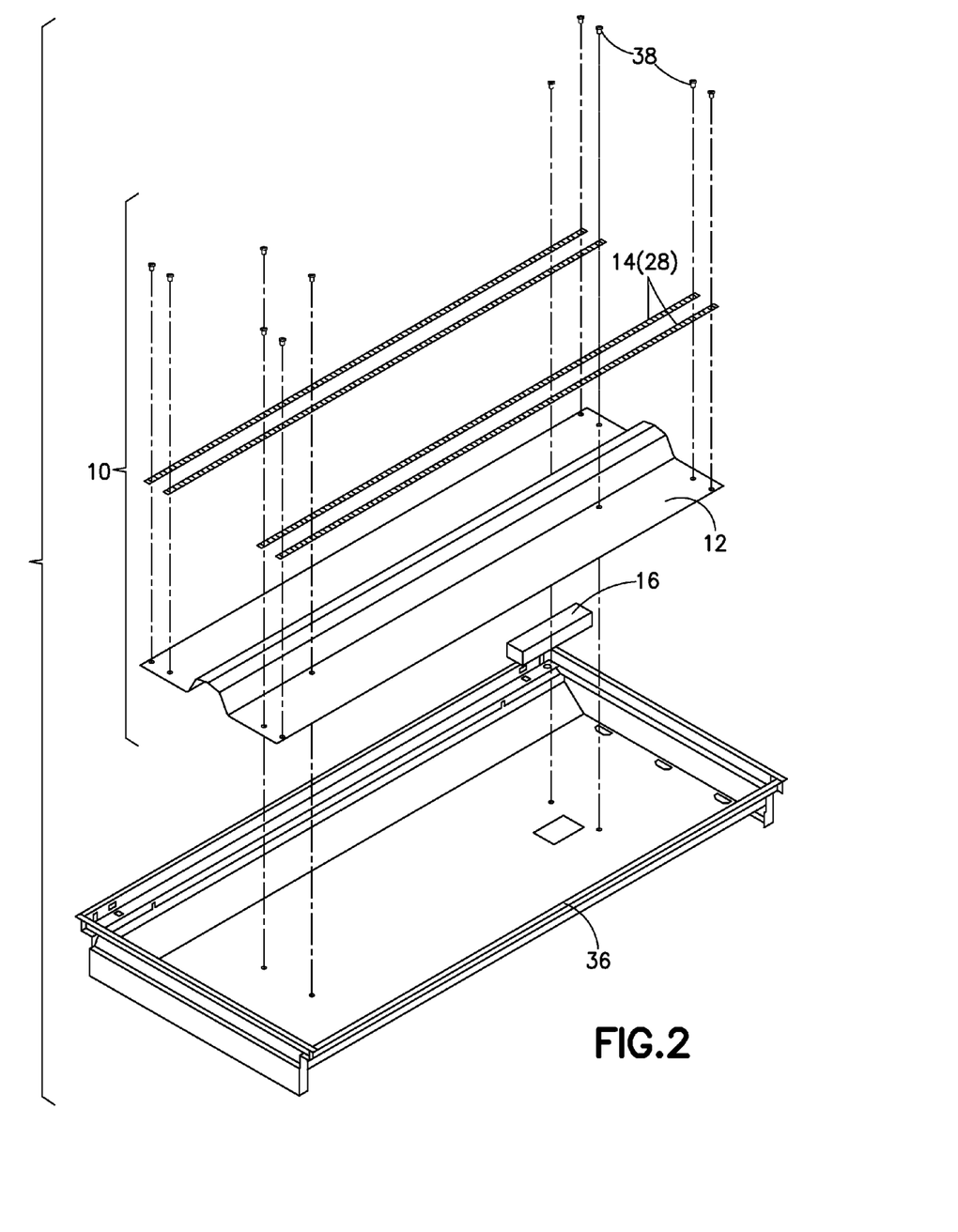
FIG. 2 is an exploded view of the assembly of FIG. 1.
Figure 3:
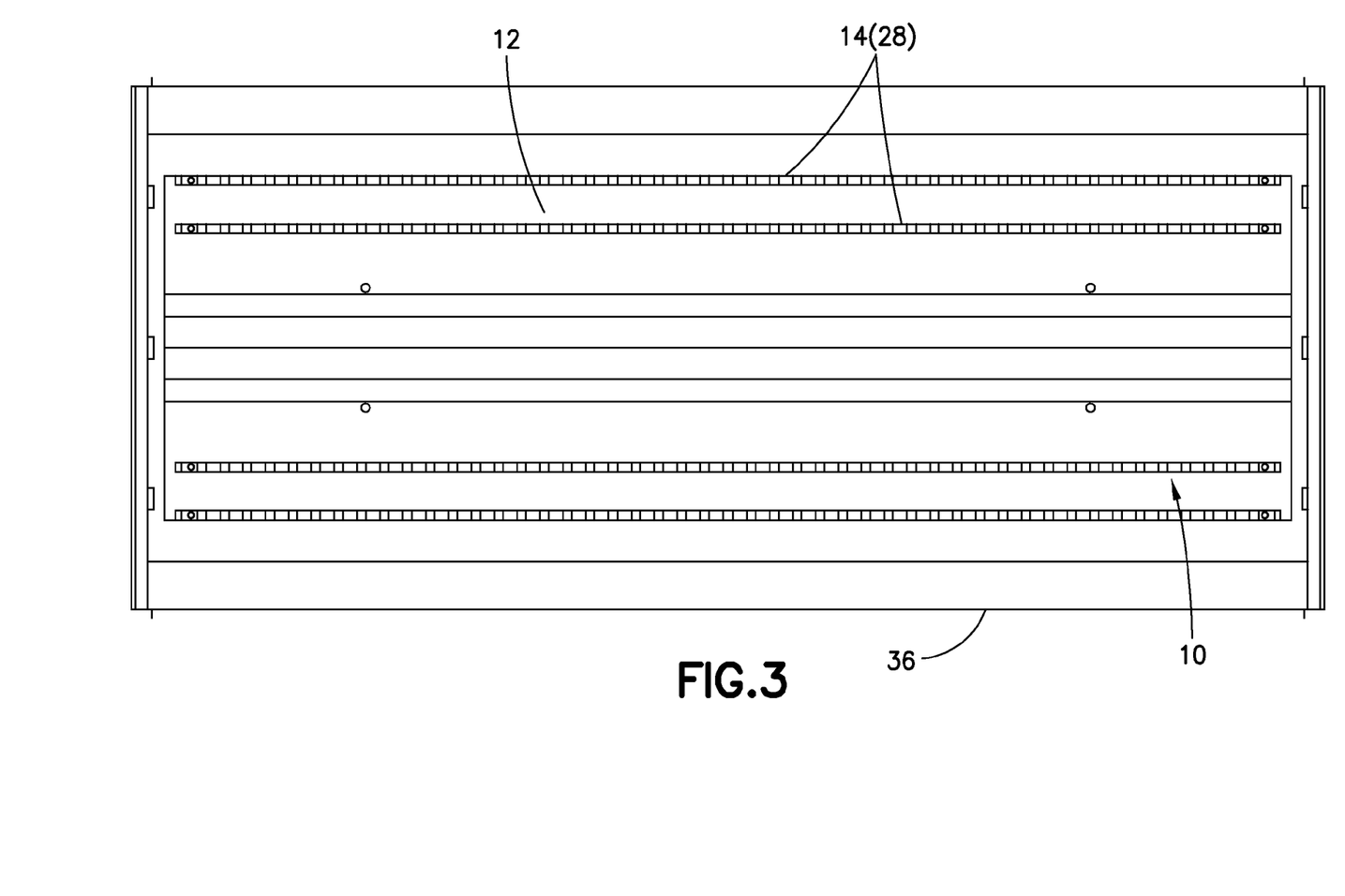
FIGS. 3 and 4 are views of the assembly of FIG. 1.
Figure 4:
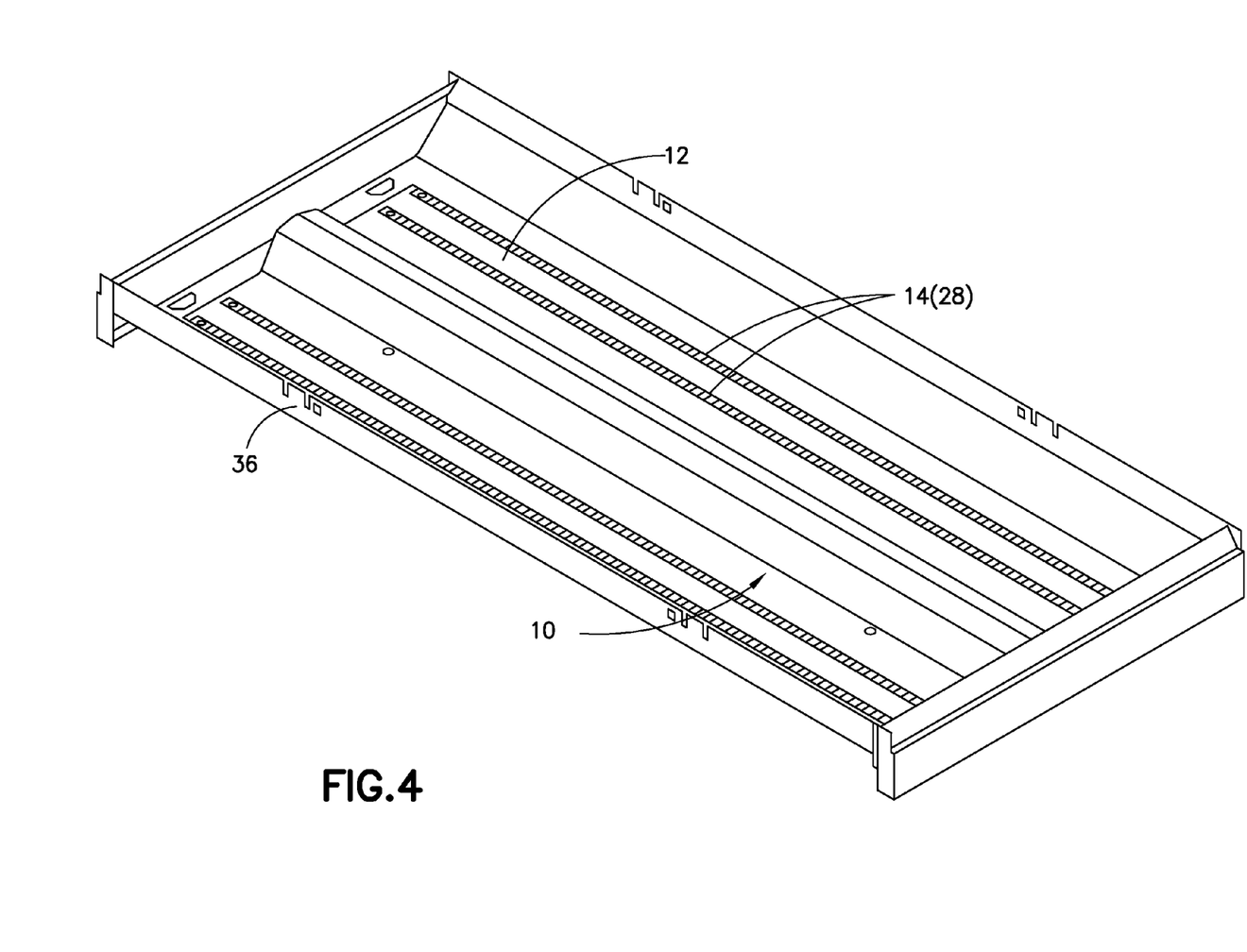
Figure 5:
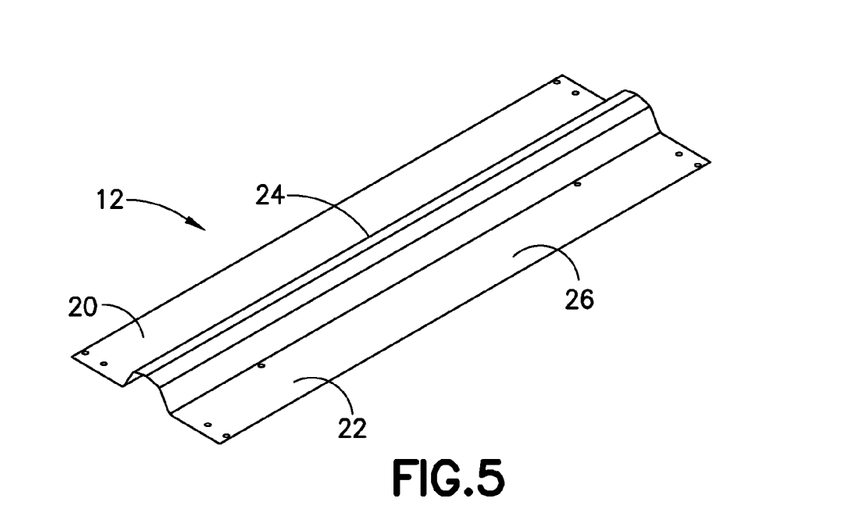
FIGS. 5-8 are various views of a carrier plate useable with the subject invention.
Figure 6:
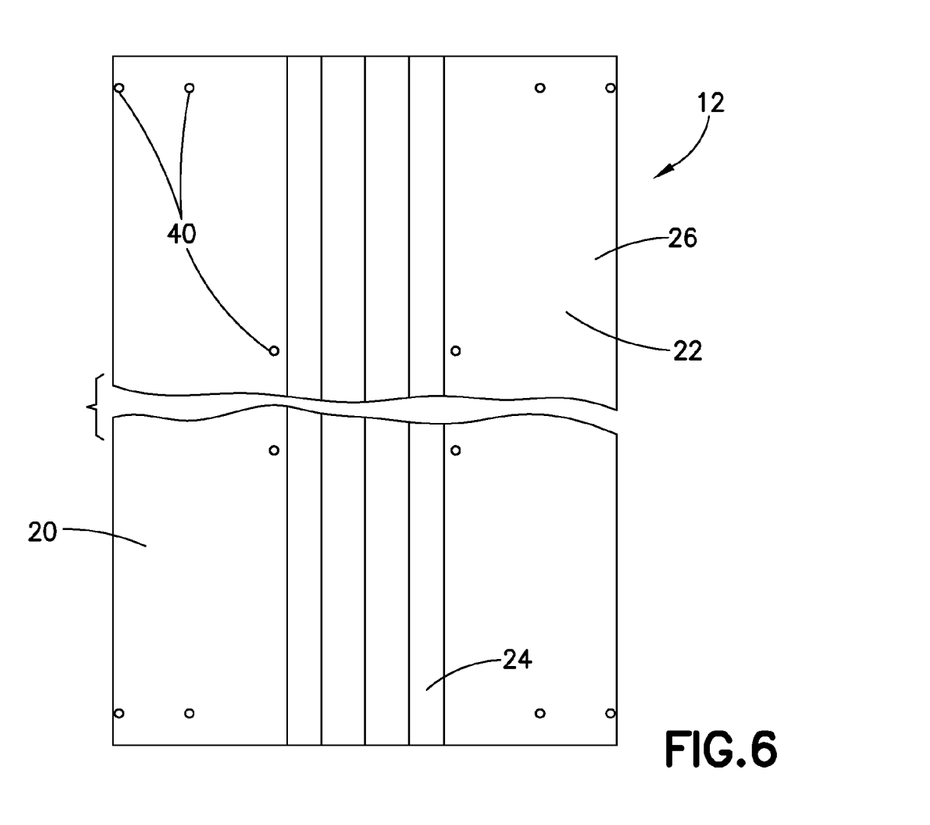
Figure 7:
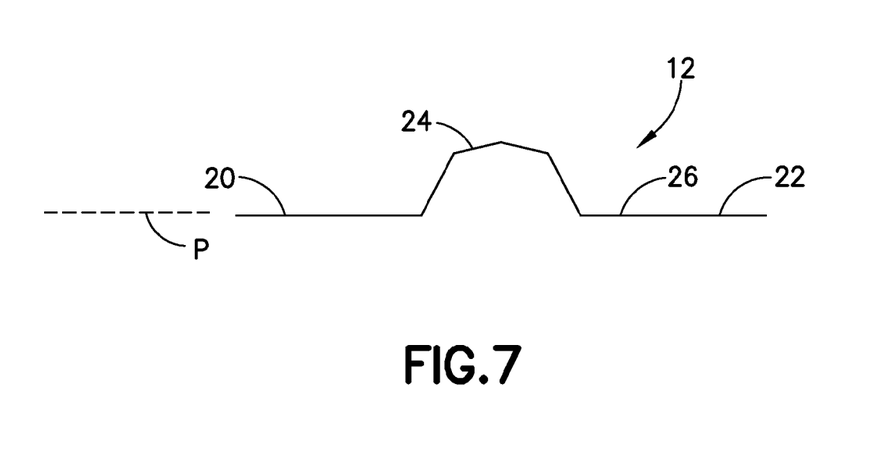
Figure 8:
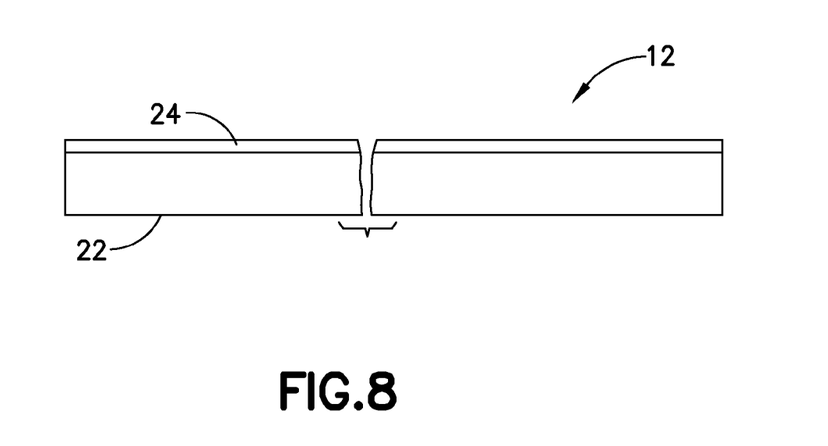
Figure 9:
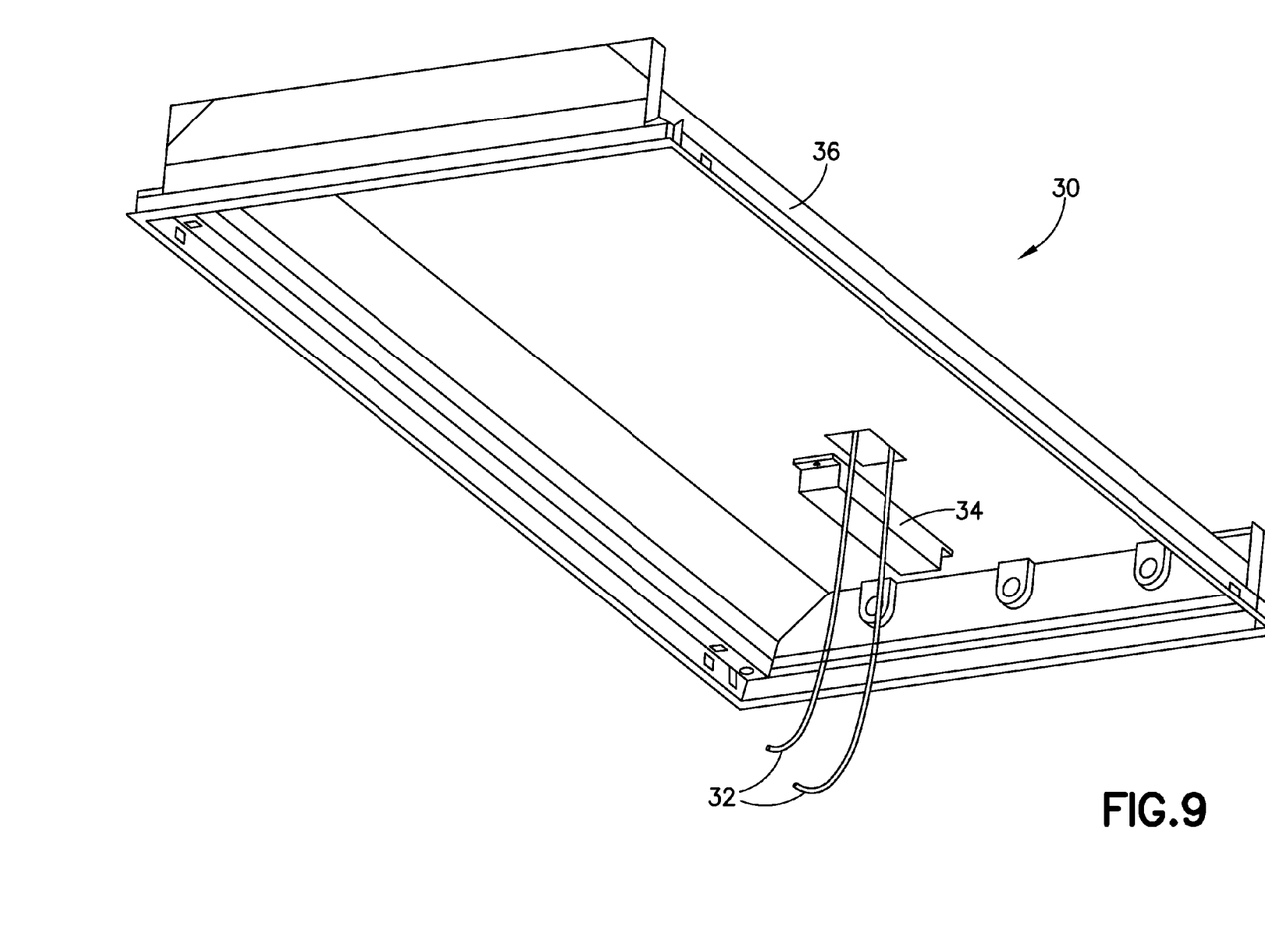
FIGS. 9-13 depict a method of retrofitting a troffer-based fluorescent light fixture in accordance with the subject invention.
Figure 10:
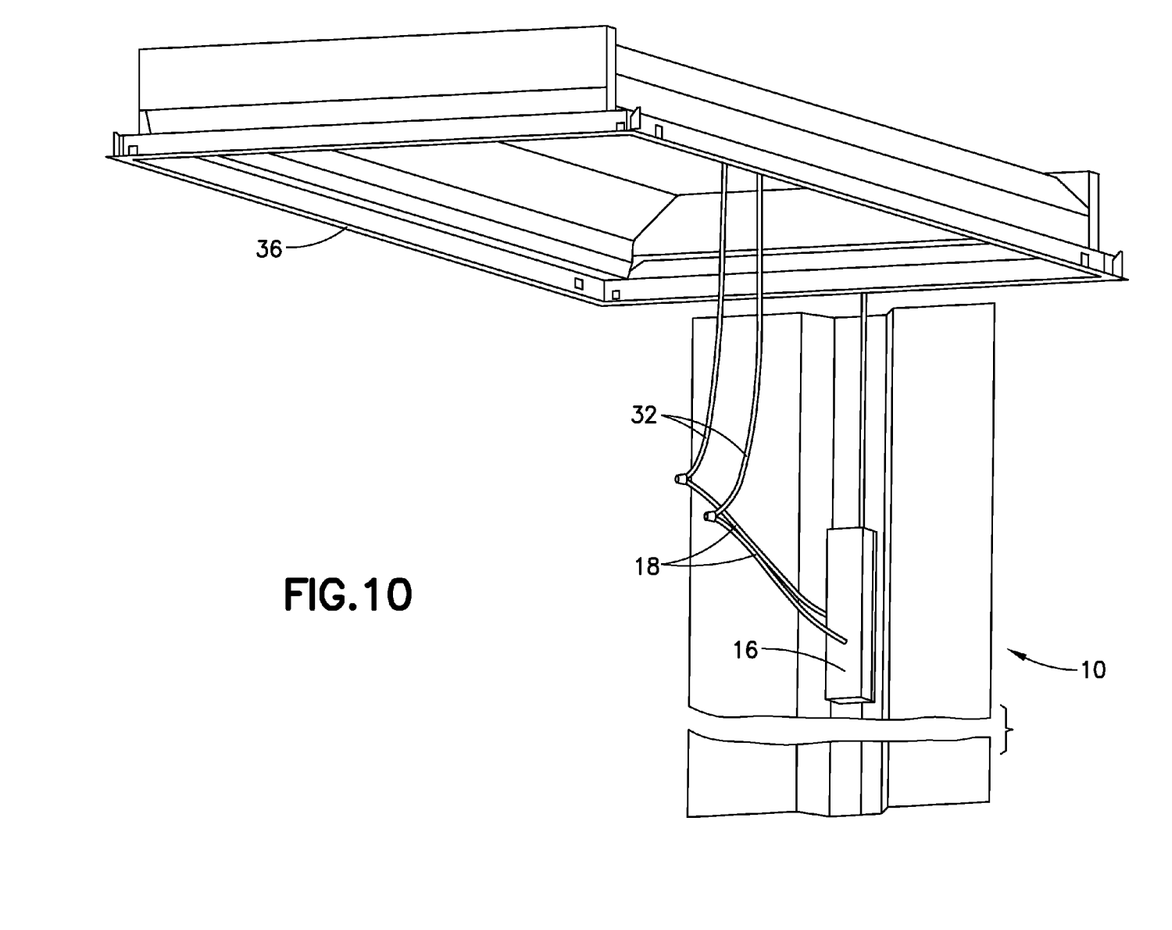
Figure 11:
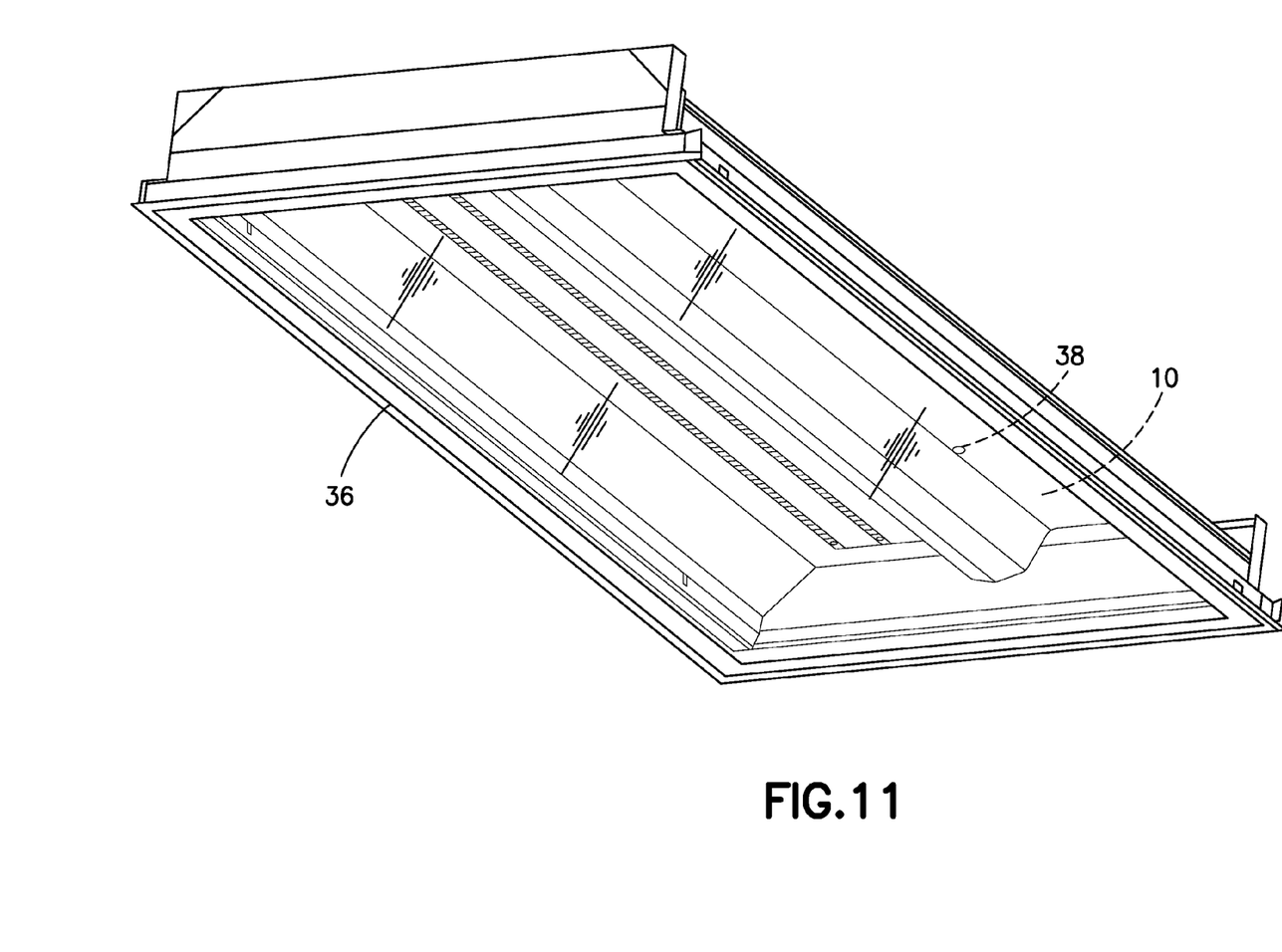
Figure 12:
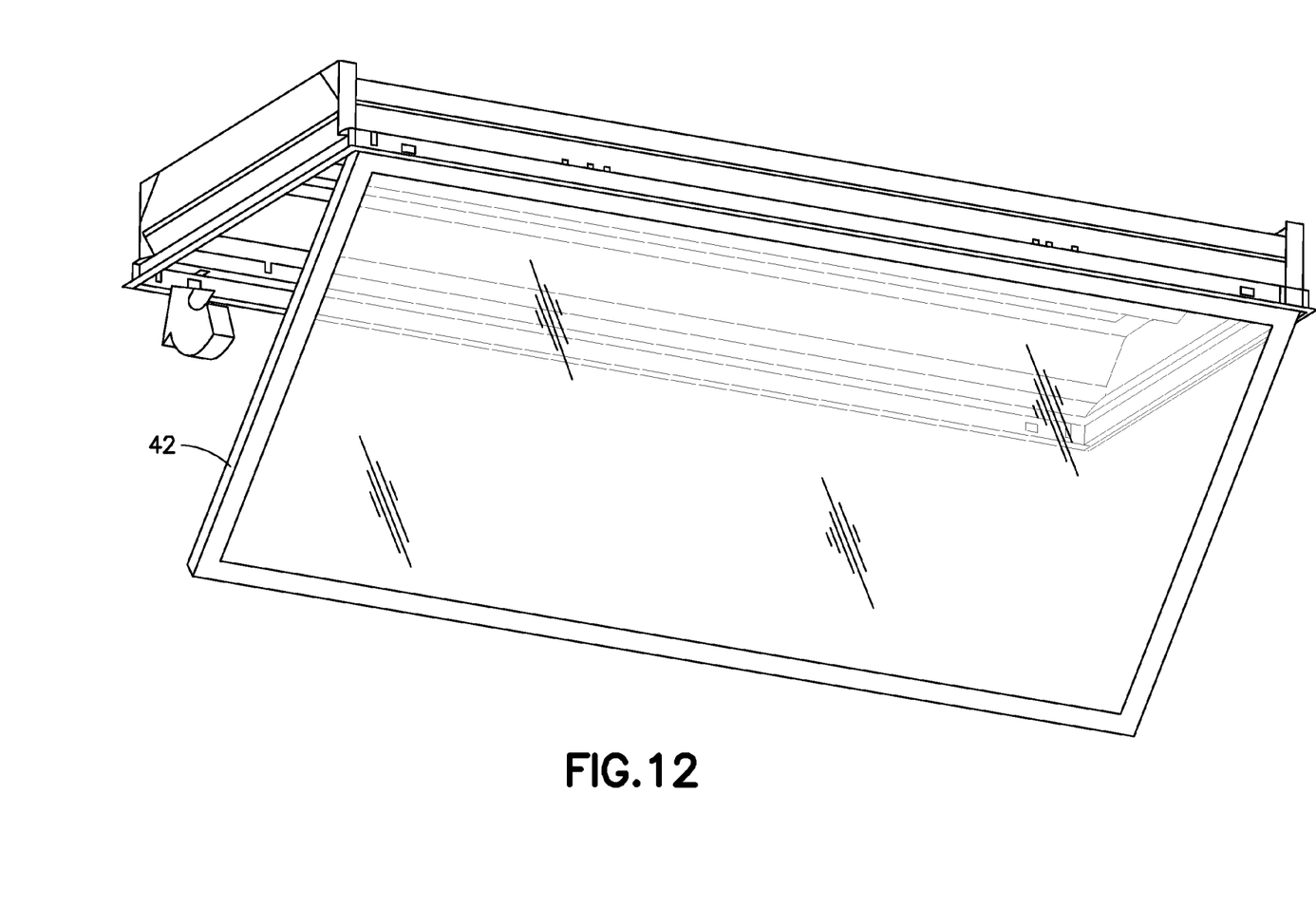
Figure 13:
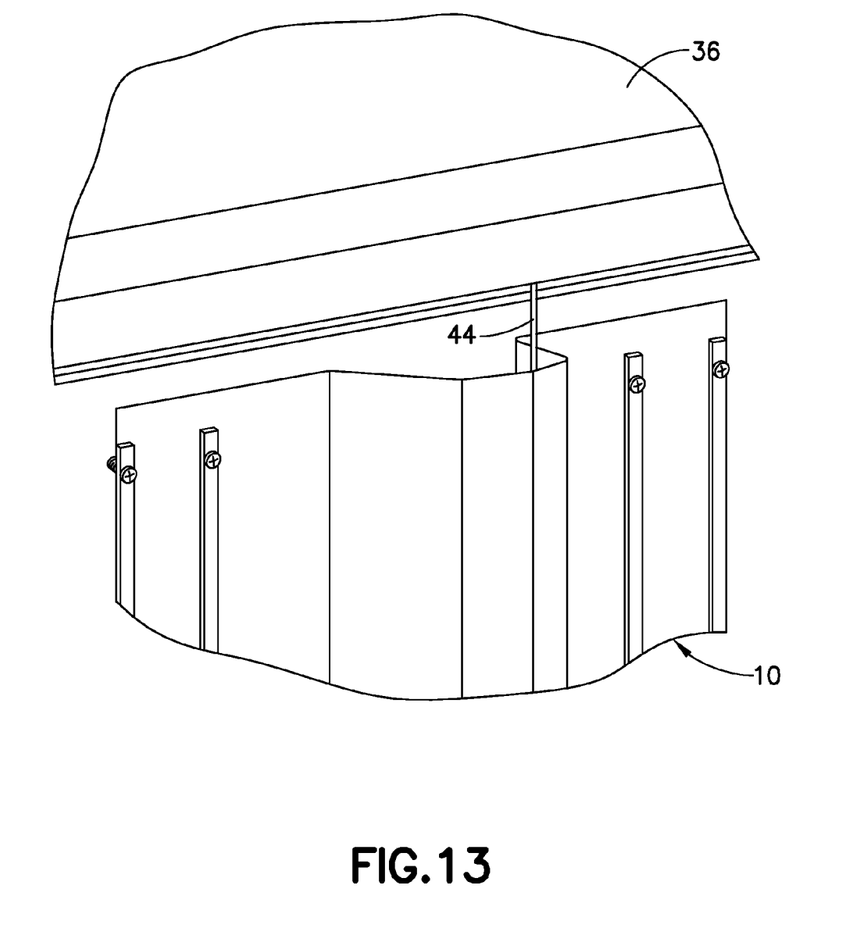
Figure 14:
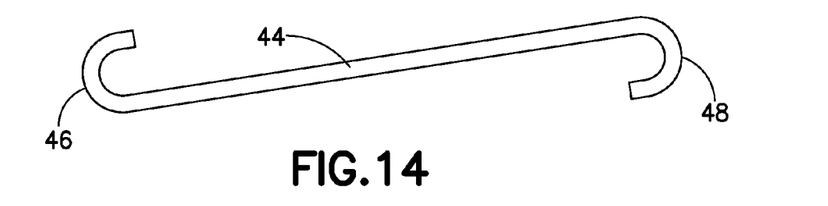
FIG. 14 is front elevational view of a hook useable with the subject invention.
Figure 15:
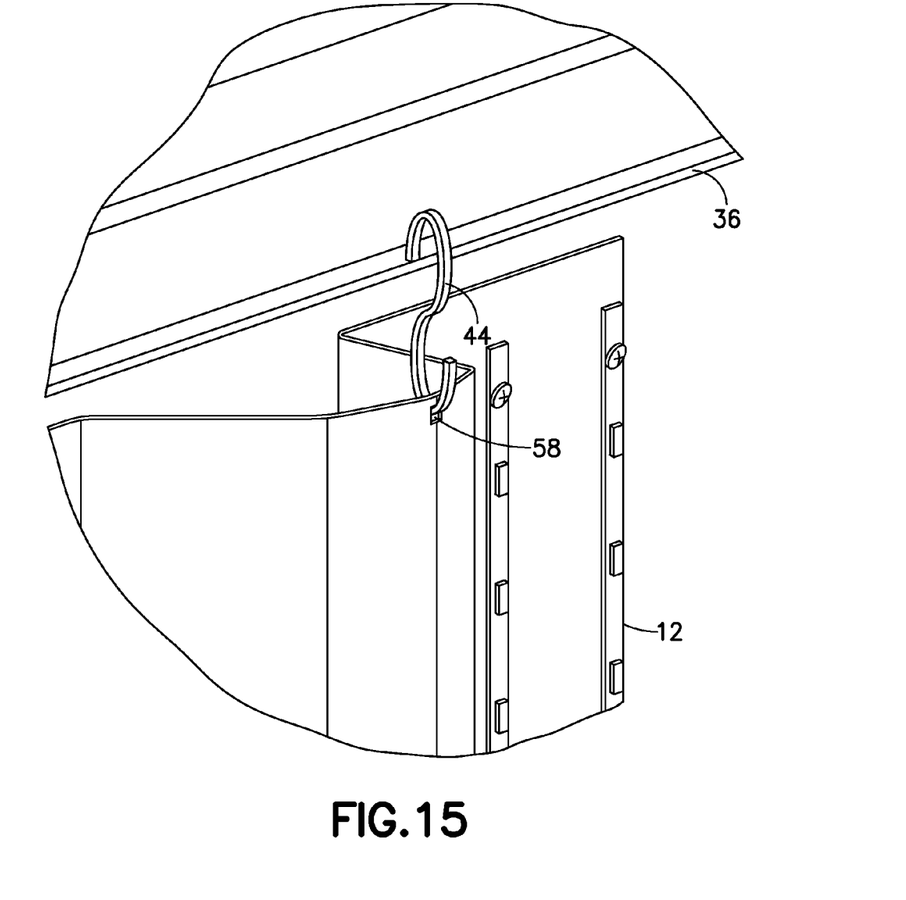
FIG. 15 is a perspective view of the hook of FIG. 14, shown in use.

To facilitate the coupling of the lead wires 18 to the electrical power wires 32, one or more hooks 44 may be provided for hanging the light fixture 10 from the troffer housing 36. Each hook 44 may include one or more hooked ends 46, 48. This allows for an installer to have both hands free during the wiring procedure. Once electrically coupled, the light fixture 10 may be removed from the one or more hooks 40 and fastened to the troffer housing 36, as discussed above.

Figure 16:
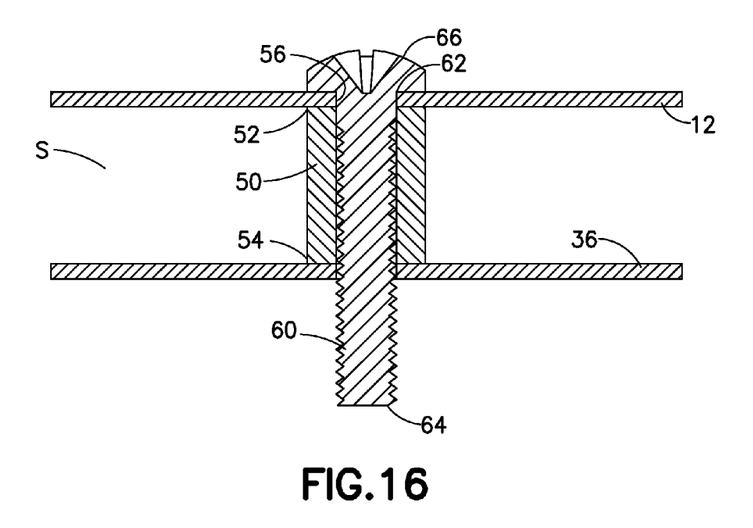
FIG. 16 is a cross-sectional elevational view of a fastener and bushing useable with the subject invention, fully assembled.
Figure 17:
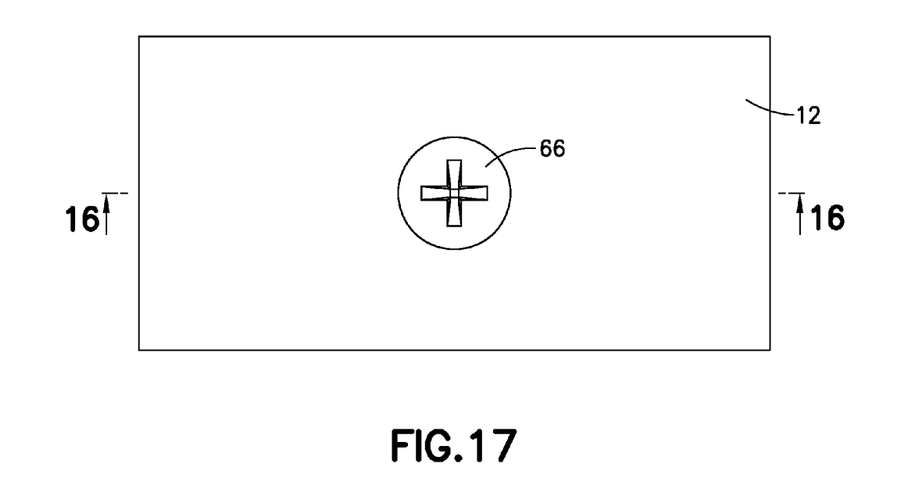
FIG. 17 is a top plan view of the fastener and bushing of FIG. 16.
Figure 18:
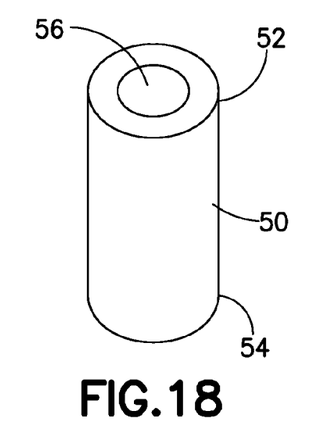
FIG. 18 is a perspective view of a bushing useable with the subject invention.
Figure 19A:
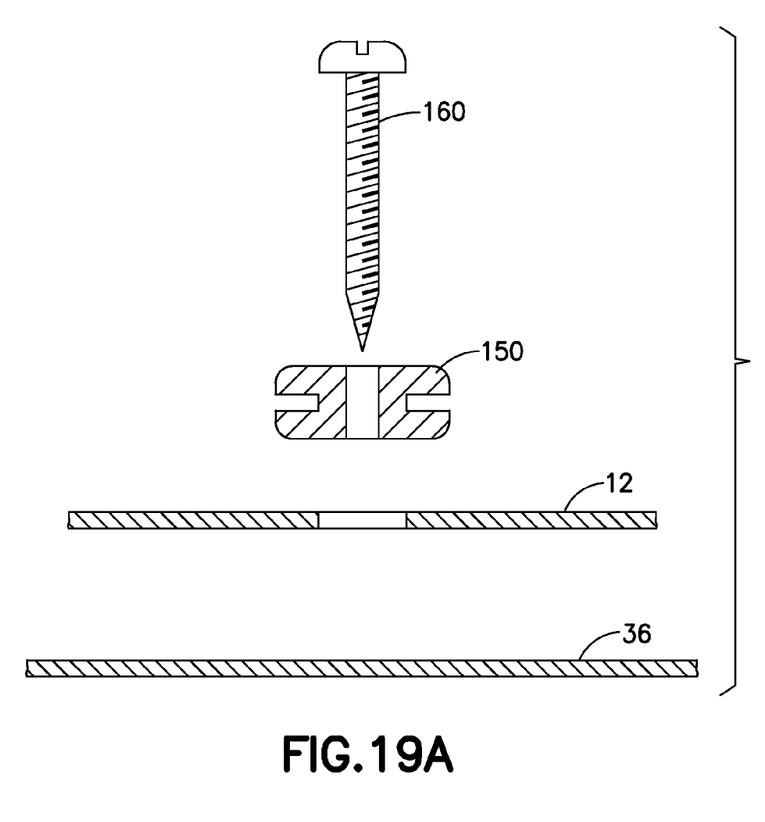
FIG. 19A is a cross-sectional elevational exploded view of another fastener and bushing useable with the subject invention.
Figure 19B:
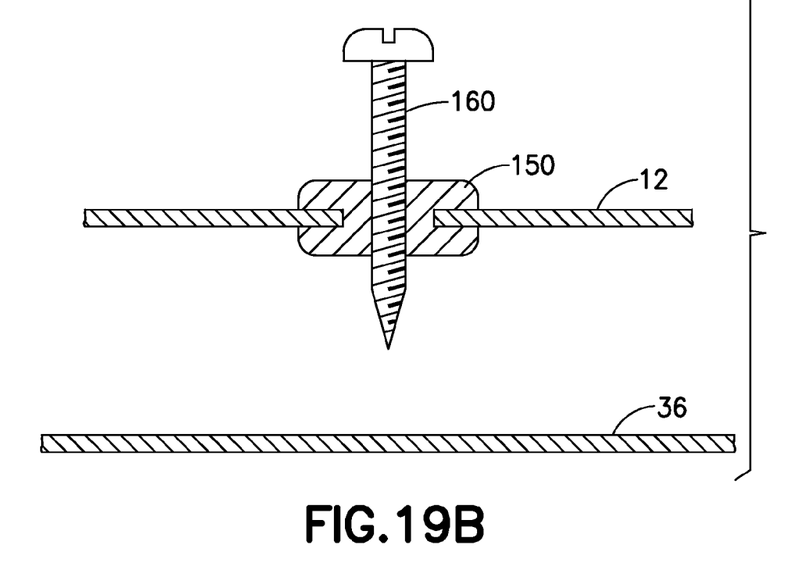
FIG. 19B is a cross-sectional elevational view of the fastener and bushing of FIG. 19A, partially assembled.
Figure 19C:
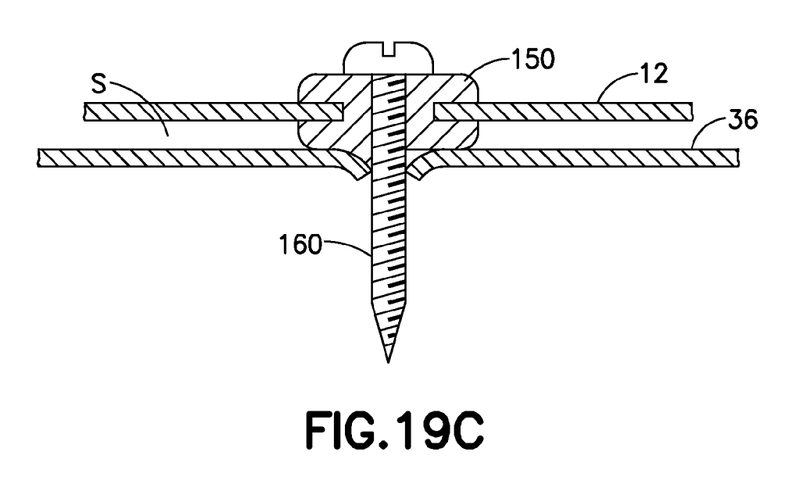
FIG. 19C is a cross-sectional elevational view of the fastener and bushing of FIG. 19A, fully assembled.

With reference to FIGS. 15-19C, a further method is disclosed for installing the light fixture 10 into the troffer housing 36. The method includes providing a plurality of bushings 50 for creating a space between the light fixture 10 and the troffer housing 36. Preferably, the bushings 50 are right circular cylinders, each extending between a proximal end 52 and a distal end 54, as shown in FIGS. 16 and 18. The bushings 50 have hollow bores 56 down the centerline, with a predetermined inside diameter. Alternatively, the bushings 50 can be grommets 150 as shown in FIGS. 19A-19C. The bushings 50 for the method are selected from the group consisting of cylindrical sleeves, washers, and grommets. It is to be understood that the bushings are not limited to those described herein, and can take many various forms within the spirit and scope of the claims. The bushings 50 may be installed using the mounting holes 40.

A plurality of threaded fasteners 60 may be utilized, each extending between a proximal end 62 and a distal end 64, and having a head 66 at the proximal end 62. The threaded fasteners 60 can be machine screws, sheet metal screws, self-tapping screws, or self-drilling screws, or any combination thereof. For example, a common type of sheet metal screw 160, which can be used for the threaded fastener 60, is also self-drilling and self-tapping, thus eliminating any need to pre-drill or tap the troffer housing 36. The threaded fasteners 60 each have a diameter between the distal end 64 and the head 66 slightly smaller than the corresponding bushing 50 predetermined inside diameter, so that the fasteners 60 will be threaded easily into the bushings 50, and yet will not fall out before assembly. During installation, the threaded fasteners 60 may be at least partially inserted into the bushings 50 and the mounting holes 40, thus supporting the threaded fasteners 60 generally perpendicularly to the carrier plate 12 in the mounting holes 40 with the bushings 50. This allows for partial assembly to aid installation.

With the carrier plate 12 being aligned in the troffer housing 36 for mounting, e.g., by manually swinging it upward utilizing the hook 44, space S is created between the carrier plate 12 and the troffer housing 36 with the bushings 50, by virtue of the length between the proximal end 52 and the distal end 54 of each of the bushings 50. The supply wires 32 may be located in the space S between the carrier plate 12 and the troffer housing 36. The carrier plate 12 is mounted to the troffer housing 36 with the threaded fasteners 60. This is easily done in the field with a battery operated hand drill.

What is claimed is:

1. A method of retrofitting a troffer-based fluorescent light fixture having a ballast and a troffer housing to a troffer-based LED light fixture, said method comprising:
    disconnecting electrical power wires from the ballast of the fluorescent light fixture;
    providing a LED light fixture having:
        a carrier plate dimensioned to fit within the troffer housing, said carrier plate having a generally flat first portion, a generally flat second portion, and an outwardly indented portion located therebetween, said first and second portions being generally coplanar in a common plane;
        at least one LED mounted to said first portion;
        a driver electrically coupled to said at least one LED and disposed within said indented portion, said driver being fixed to said carrier plate; and,
        at least two lead wires electrically coupled to said driver, and extending therefrom, configured to allow electrical power to pass therethrough to said driver;
    at least partially inserting fasteners through said carrier plate and into corresponding bushings such that said bushings are retentively maintained with said carrier plate;
    electrically coupling said electrical power wires to said lead wires;

aligning said carrier plate in the troffer housing with said bushings being retentively maintained with said carrier plate; and, fastening said first and second portions of said carrier plate to the troffer housing with said bushings being located between said carrier plate and the troffer housing, and with said at least one LED facing outwardly.

2. A method as in claim 1, wherein said carrier plate is metallic.

3. A method as in claim 1, wherein said carrier plate includes a non-reflective, matte finish.

4. A method as in claim 1, wherein a plurality of LED's is provided.

5. A method as in claim 4, wherein a portion of said LED's is arranged electrically in series.

6. A method as in claim 4, wherein at least a portion of said LED's is arranged electrically in parallel.

7. A method as in claim 1, further comprising hanging said LED light fixture from said troffer housing so that said LED light fixture hangs from said troffer housing during the step of electrically coupling said electrical power wires to said lead wires.

8. A method as in claim 1, wherein at least one LED is mounted to said second portion.

9. A method as in claim 1, wherein said bushings may be selected from the group consisting of cylindrical sleeves, washers, and grommets.

10. A method as in claim 1, wherein said fasteners are threaded fasteners.

11. A method as in claim 1, wherein said driver is disposed within said indented portion without extending through said common plane.

\* \* \* \* \*